United States Patent Office 2,806,873

Patented Sept. 17, 1957

1

2,806,873

POLYMERIC ADIPATE OF DIMETHYL-HEXYNEDIOL

Daniel C. Rowlands, Worthington, Ohio, assignor, by mesne assignments, to Air Reduction Company, Inc., New York, N. Y., a corporation of New York No Drawing. Application October 29, 1954, Serial No. 465,739

2 Claims. (Cl. 260—485)

This invention relates to a novel chemical compound and to a process of preparing the same. More particularly, the invention is concerned with a new polymeric adipate of 2,5-dimethyl-3-hexyne-2,5-diol and which adipate can be represented by the formula:

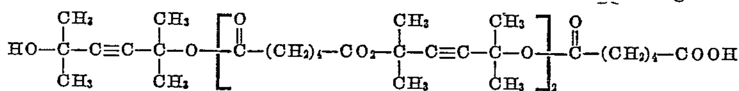

This new compound may be used as a plasticizer, a lubricant, or as an organic intermediate.

The novel adipate of 2,5-dimethyl-3-hexyne-2,5-diol can be obtained by reacting adipyl chloride with 2,5-dimethyl-3-hexyne-2,5-diol in the presence of an acid acceptor such as pyridine and in a liquid medium inert with respect to the reactants and products of reaction.

While the following exampel will serve to illustrate the invention more fully, it is not to be construed as limiting the scope of the invention.

Freshly distilled adipyl chloride (56.0 g., 0.306 mole) in an equal volume of benzene was added dropwise to a stirred mixture of 2,5-dimethyl-3-hexyne-2,5-diol (4.35 g., 0.306 mole), pyridine (79.1 g., 1.0 mole), and benzene (700 ml.). During such addition, the temperature of the mixture was maintained at 45–55° C. The mixture was continuously stirred and maintained at about 60° C. during the entire reaction period. The solution was then cooled and the precipitate, pyridine hydrochloride, was separated by filtration. The filtrate was washed with water, dilute hydrochloric acid, more water, and dried.

2

The volume of the product and solvent was reduced to about 300 ml. The remaining solvent and pyridine were evaporated, the last traces being removed by heating at 75–100° C. for two hours at <1-mm. pressure.

The average molecular weight of the product was 706, based on two determinations of the product in boiling benzene. A sample was heated with four parts by weight of elemental sulfur; up to 180° C., there was no evidence of any fundamental change in the product; and at 200° C., the product began to decompose. When the mixture was cooled, the mobility (consistency of molasses) was unchanged.

What is claimed is:

1. A composition of matter comprising a mixture of low molecular weight polyesters obtained by reacting adipyl chloride with 2,5-dimethyl-3-hexyne-2,5-diol in the presence of an acid acceptor, the mole ratio of said adipyl chloride to said 2,5-dimethyl-3-hexyne-2,5-diol being about 1 to 1, and conducting the reaction in benzene and at a temperature of about 60° C.

2. A process of preparing an adipate of 2,5-dimethyl-3-hexyne-2,5-diol which comprises reacting adipyl chloride with 2,5-dimethyl-3-hexyne-2,5-diol in the presence of an acid acceptor, the mole ratio of said adipyl chloride to said 2,5-dimethyl-3-hexyne-2,5-diol being about 1 to 1, and conducting the reaction in benezene and at a temperature of about 60° C.

References Cited in the file of this patent

UNITED STATES PATENTS

| | | |
|---|---|---|
| 2,250,445 | Bruson et al. | July 29, 1941 |
| 2,611,756 | Pockel | Sept. 23, 1952 |

FOREIGN PATENTS

| | | |
|---|---|---|
| 801,738 | Germany | Jan. 1, 1952 |

OTHER REFERENCES

Shorland: J. Am. Chem. Soc. 57 (1935).

Wagner et al.: Synthetic Organic Chemistry (1953), pp. 481–2.